United States Patent [19]

Lee

[11] Patent Number: 5,088,785
[45] Date of Patent: Feb. 18, 1992

[54] VOLUME-CHANGEABLE VAN COMPARTMENT

[76] Inventor: Shenq-Hwa Lee, No. 38-1, Taa-Jzyy-Jyue, Taa-Jyue Tsuen, Guan-In Country, TAOR-Yuarn County, Taiwan

[21] Appl. No.: 604,046

[22] Filed: Oct. 25, 1990

[51] Int. Cl.$^5$ .............................................. B62D 33/08
[52] U.S. Cl. ....................................... 296/26; 296/36; 296/175
[58] Field of Search .......................... 296/26, 36, 175; 105/378, 379, 393

[56] References Cited

U.S. PATENT DOCUMENTS

| | | | |
|---|---|---|---|
| 2,656,216 | 10/1953 | Bobroff | 296/26 X |
| 2,797,124 | 6/1957 | Hauptli | 296/26 |
| 2,821,428 | 1/1958 | Webster | 296/26 |
| 3,061,358 | 10/1962 | Lien | 296/26 |
| 3,694,024 | 9/1972 | Linville | 296/26 |
| 3,819,223 | 6/1974 | Cobb | 296/26 |
| 3,940,179 | 2/1976 | McBride | 296/36 X |
| 4,103,958 | 8/1978 | Parent | 296/26 X |

Primary Examiner—Dennis H. Pedder
Attorney, Agent, or Firm—Browdy and Neimark

[57] ABSTRACT

A volume-changeable van compartment including an outer wall and an inner wall wherein four hydraulic cylinders are disposed on the inner wall to lift/lower the outer wall, and an equilibration mechanism for keeping the hydraulic cylinders operating at same speed, and a locking mechanism for locking up the outer wall at a certain height, a plurality of vertical male rails being evenly disposed on the outer wall and a plurality of corresponding female rails being disposed on the inner wall whereby the hydraulic cylinders can operate to lift/lower the outer wall for enlarging the volume of the van compartment, on two sides of each of the female rails being formed a groove whereby a wall board can be disposed between two adjacent female rails to form a portion of the inner wall.

2 Claims, 7 Drawing Sheets

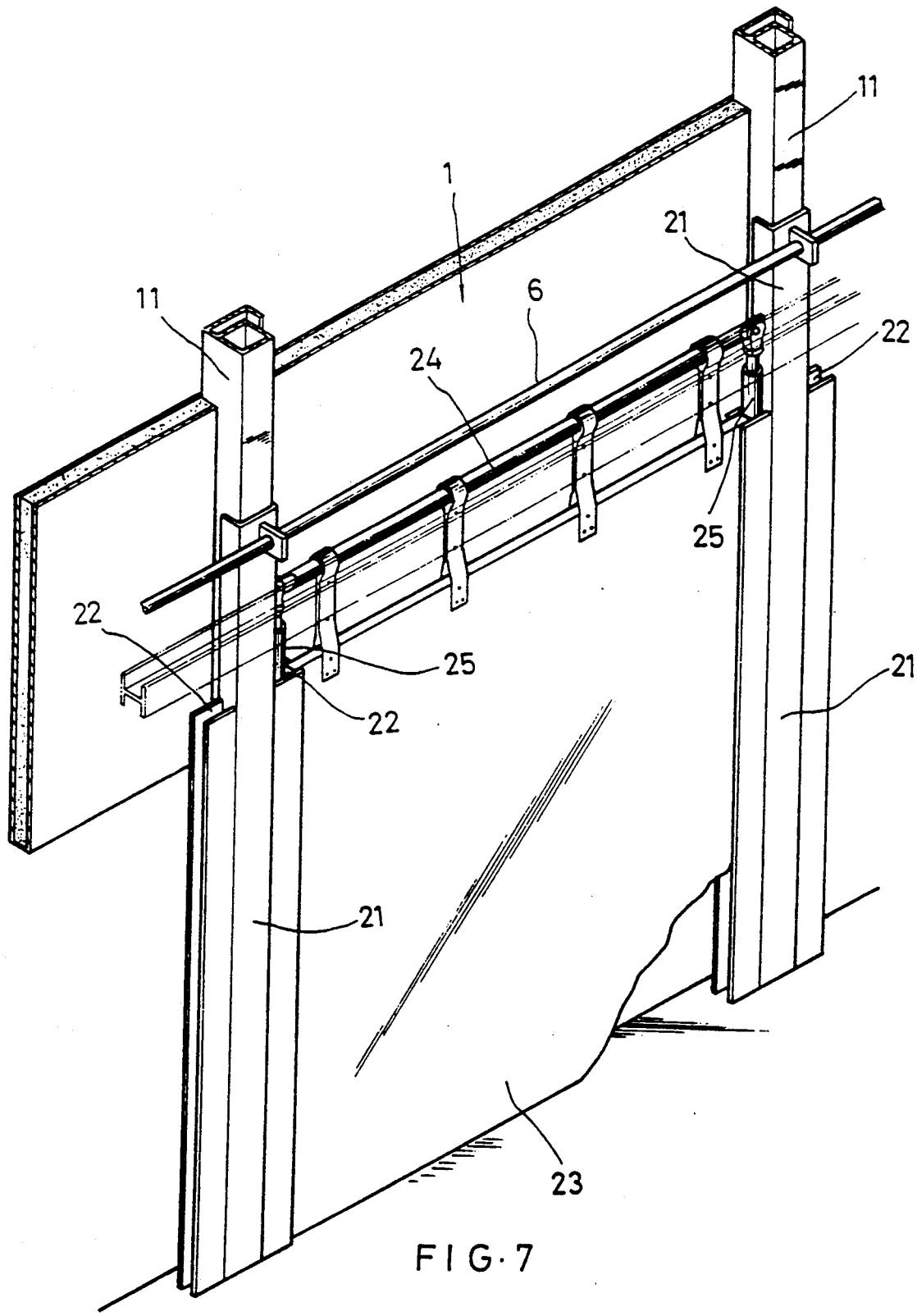
FIG·7

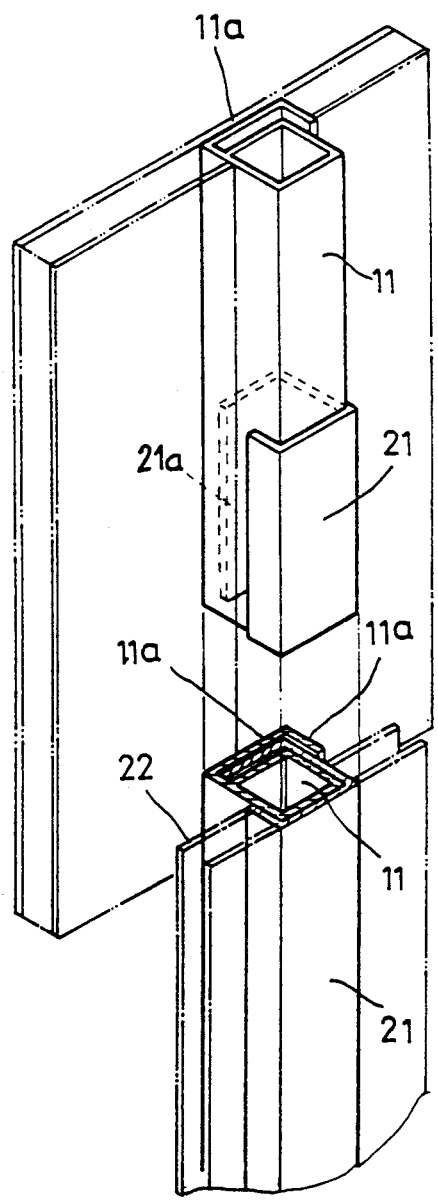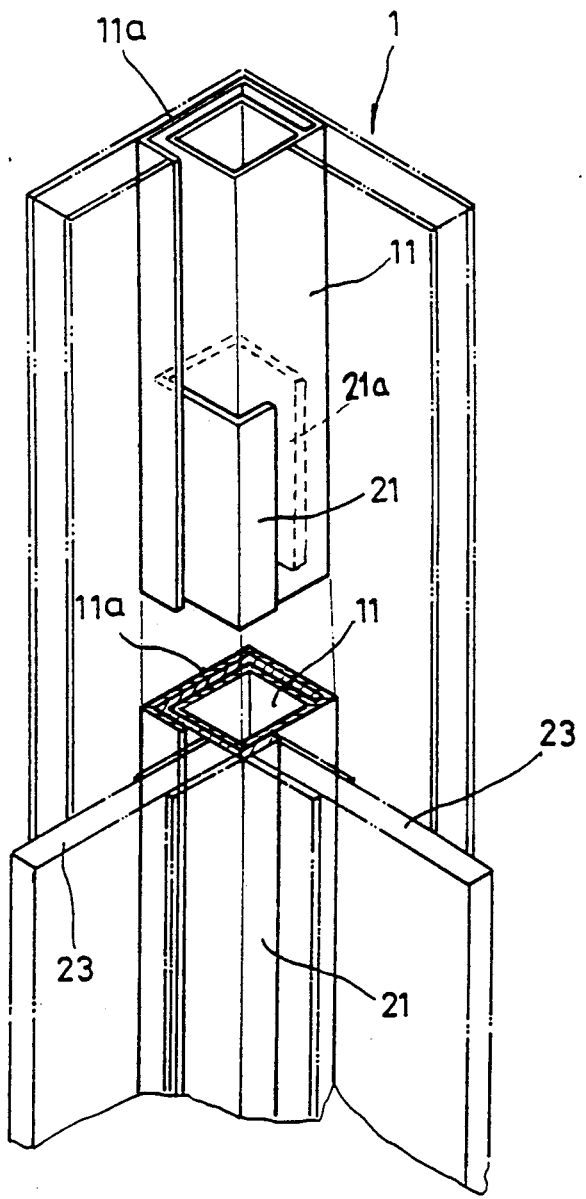
FIG·8  FIG·9

5,088,785

VOLUME-CHANGEABLE VAN COMPARTMENT

BACKGROUND OF THE INVENTION

At present, the vans used in general transportation can be divided into two types, one of which is compartment structured type of van, and the other of which is involucrumless type of van. With respect to the former, the inner volume thereof is limited so that the compartment structured type of van ca only carry some cargoes with a small range of sizes. In case that the articles to be transported are larger or longer things, such as machines, furnitures, etc., the compartment structured van will not be serviceable. At this point, the involucrumless van should be used. However, since the involucrumless van is without compartment wall, therefore, the loaded articles must be tightly tied to the van and the tied articles will inevitably become loose due to van quake and swinging. In case the loaded articles drop down to the ground or even drop down and break a car behind the van, great damage and injury will be caused.

SUMMARY OF THE INVENTION

It is an object of the invention to provide a van compartment including an outer wall and an inner wall. On the inner wall are disposed four hydraulic cylinders to lift the outer wall for enlarging the compartment volume.

According to the object, four vertical racks and three horizontal gear rods are disposed wherein the upper ends of the four racks are pivotably connected with the outer wall and the three gear rods mesh with one another so as to keep the hydraulic cylinders operating at same speed for evenly lifting/lowering the outer wall of the compartment.

A toothed block is driven by a pneumatic cylinder whereby when the outer wall is lifted to a desired height, the toothed block can mesh with the rack to lock up the outer wall.

The present invention can be best understood through the following description and accompanying drawings wherein:

BRIEF DESCRIPTION OF THE DRAWINGS

FIG. 7 shows the wall board structure of the inner wall of this invention;

FIG. 8 shows the male and female rails which permit the wall board to be disposed at 180° angle; and FIG. 9 shows the male and female rails which permit the wall board to be disposed at 90° angle.

DETAILED DESCRIPTION OF THE PREFERRED EMBODIMENT

Figure 1:
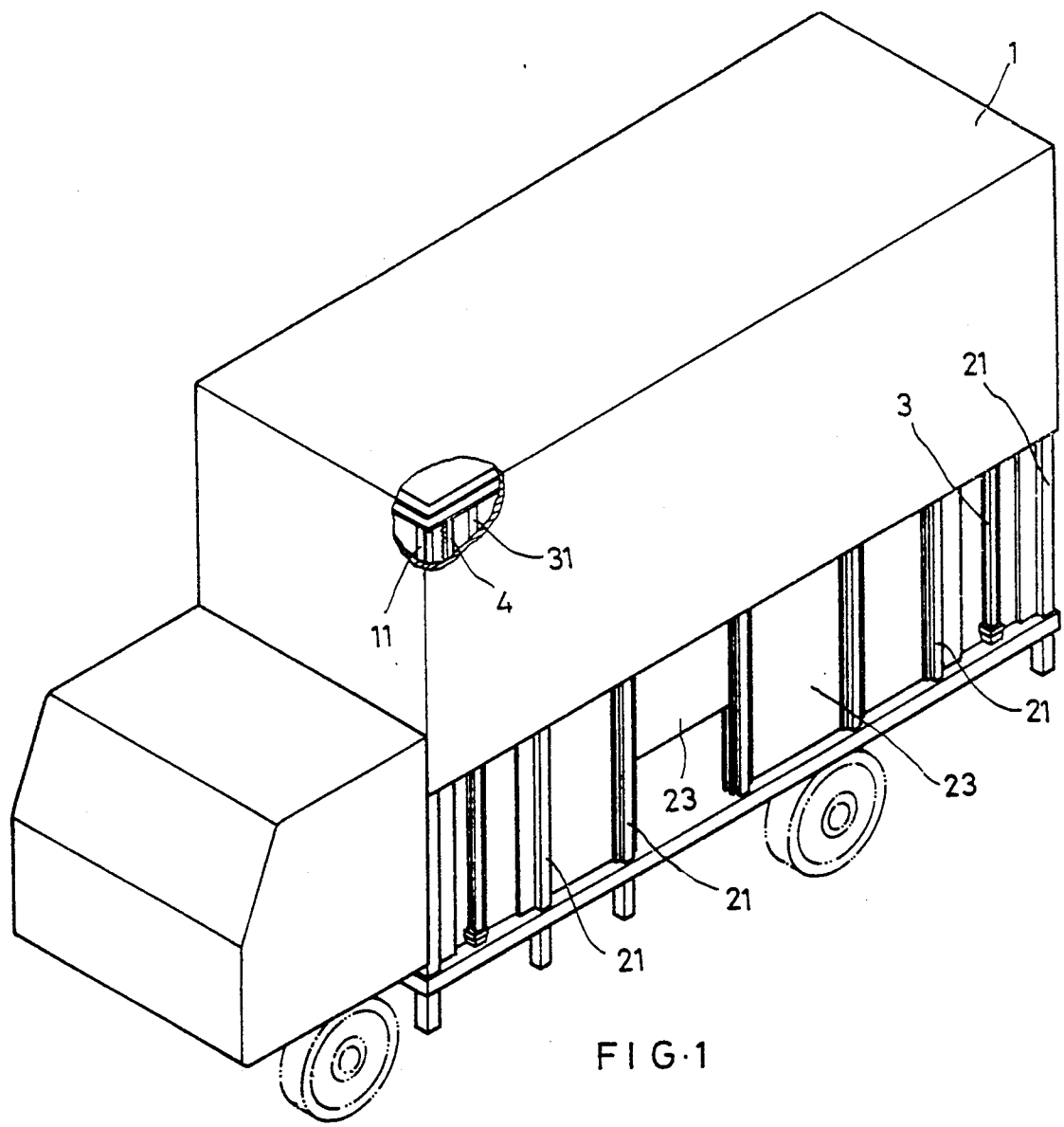
FIG. 1 is a perspective view of the van compartment of this invention wherein the outer wall is lifted.
Figure 2:
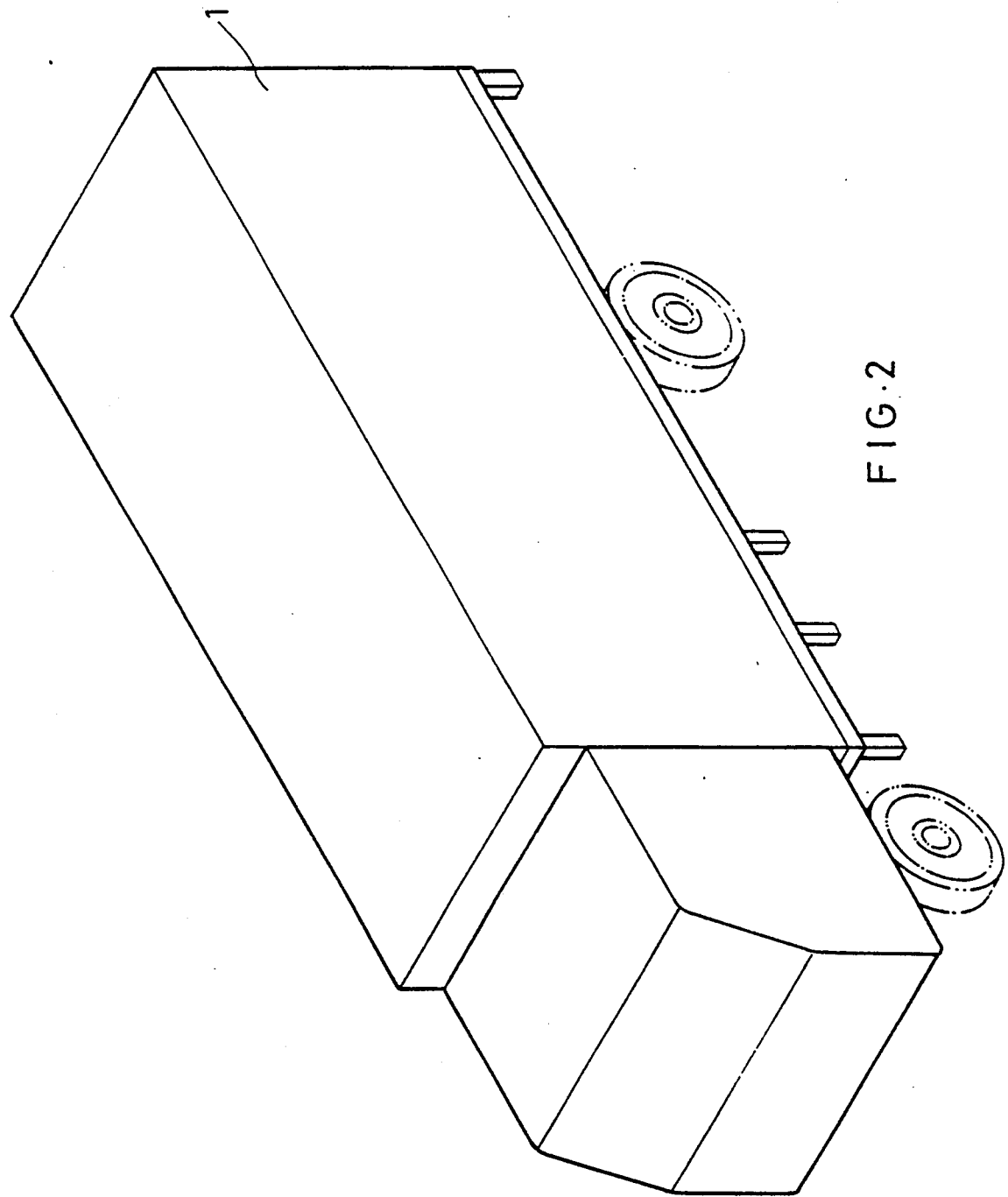
FIG. 2 is a view according to FIG. 1 wherein the outer wall is lowered to the lowest position.
Figure 3:
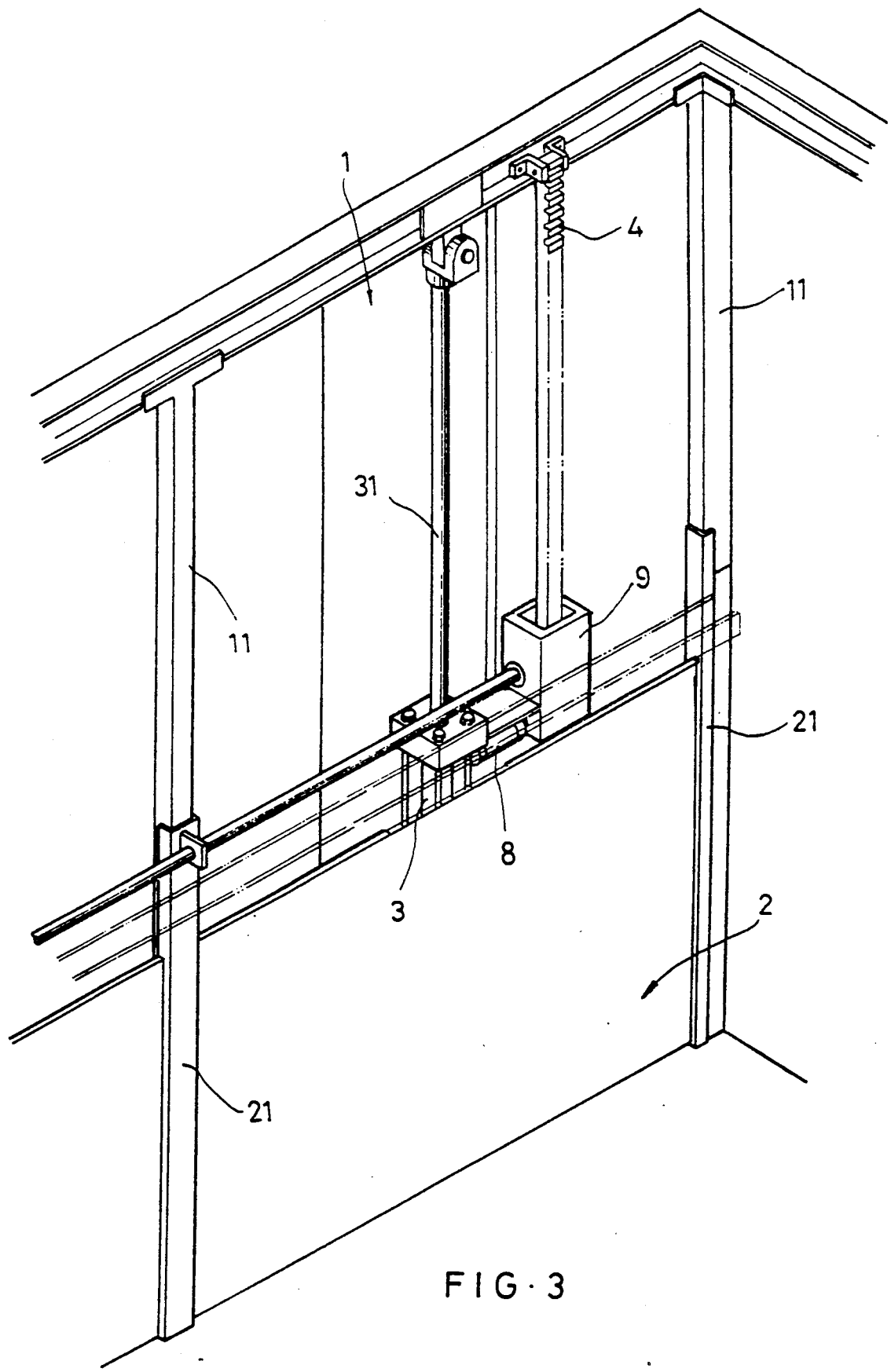
FIG. 3 shows the hydraulic cylinder drive mechanism lifting/lowering the outer wall.
Figure 4:
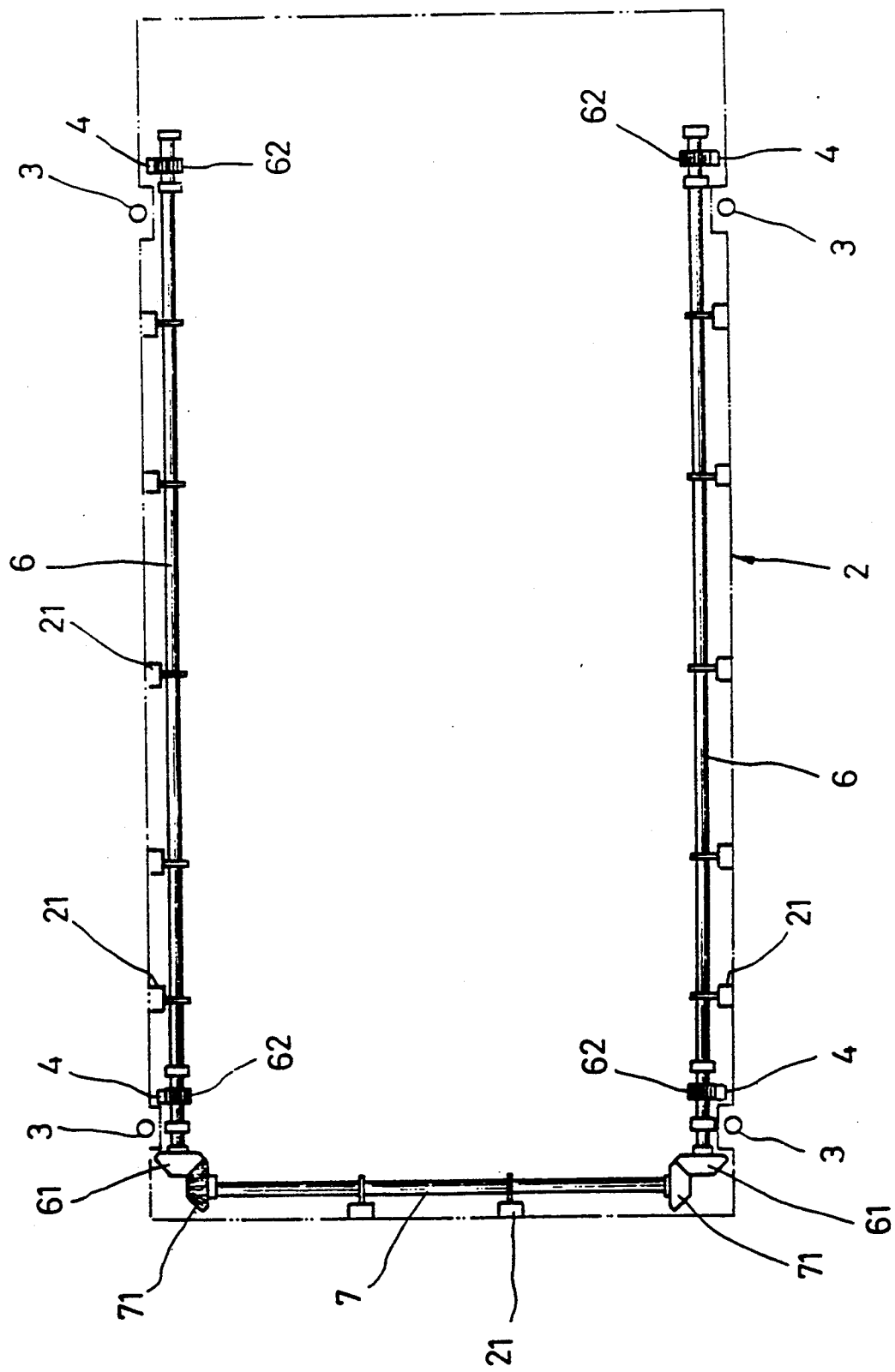
FIG. 4 shows the equilibration mechanism of this invention.
Figure 6:
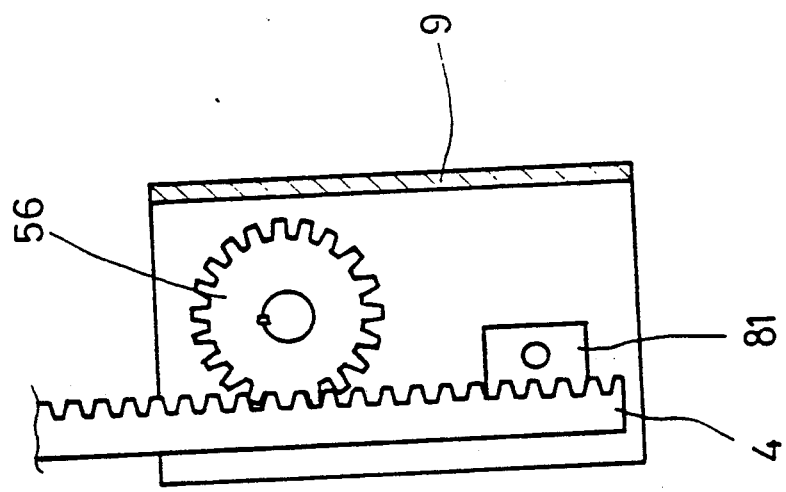
FIG. 6 is a sectional view taken on line 6—6 of FIG. 5.
Figure 5:
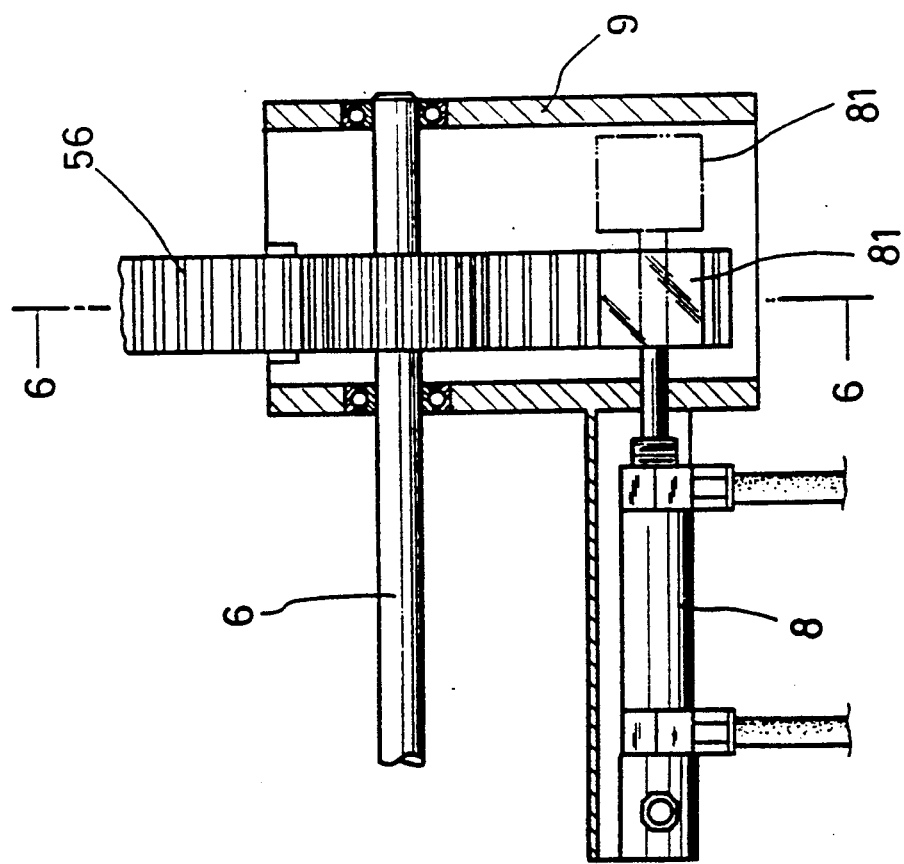
FIG. 5 shows the locking mechanism of this invention.

Please refer to FIG. 1. The van compartment of the present invention includes an outer wall 1 and an inner wall 2 wherein the inner wall 2 has no roof while the outer wall 1 has no base. A plurality of vertical male rails 11 are evenly disposed on the outer wall 1 and a plurality of corresponding female rails 21 are disposed on the inner wall 2. On two sides of the inner wall 2 are disposed four hydraulic cylinders 3 (two of which are not shown in FIG. 1). Each hydraulic cylinder 3 has a plunger 31 the top end of which connects with the upper surface of the outer wall 1. When the hydraulic cylinders 3 operate to extend/retract the plunger 31, the outer wall 1 will be lifted/lowered. Therefore, the volume of the compartment can be changed according to the actual shipping requirements.

The present invention further includes an equilibration mechanism for unifying the extending/retracting speed of the plungers 31. The equilibration mechanism includes four vertical racks 4 and three horizontal gear rods 6, 7. The four racks 4 are separately disposed beside the four hydraulic cylinders 3 and pivotably connected with the upper surface of the outer wall 1. The three gear rods 6, 7 are disposed on two lateral surfaces and front surface of the inner wall 2, respectively. At two ends of the front surface gear rod 7 are separately disposed two oblique gears 71 which mesh with oblique gears 61 of the lateral surface gear rods 6. At front and rear ends of the gear rods 6 are disposed four gears 62 which separately engage with the four racks 4 whereby when four hydraulic cylinders 3 operate to lift/lower the outer wall 1, the four racks 4 will drive the four gears 62 to synchronously rotate the three gear rods 6, 7. As a result, the four hydraulic cylinders 3 will perform lifting/lowering operation at same speed to achieve equilibrant effect.

The present invention further includes a locking mechanism having four locking devices. When the outer wall 1 is lifted to a certain position, the locking mechanism can lock up the outer wall 1. In the locking mechanism, a pneumatic cylinder 8 (or a hydraulic cylinder) drives a toothed block 81. The teeth of the toothed block 81 engage with the racks 4. When locking the outer wall 1 at some height, the pneumatic cylinder 8 drives the block 81 to mesh with the racks 4. The locking mechanism can decrease the load on the hydraulic cylinder 3 and insure the lifted condition of the outer wall 4.

On two sides of each female rail 21 of the inner wall 2 are formed grooves 22. Between two adjacent female rails 21 can be disposed a wall board 23 by means of the grooves 22 to form a portion of the inner wall 2. A beam member 24 is connected with the upper edge of each wall board 23. Two ends of the beam member 24 are connected with two hydraulic cylinders 25 so that the hydraulic cylinders 25 can lift the wall board 23 for the convenience of loading/unloading through two sides of the compartment.

The present invention can further include four sets of gear housings 9 to receive the gears 62 and block 81 and guide the rocks 4. Moreover, for security in operation, a controlling circuit can be designed so that only when the air cylinder 8 drives the block 81 to separate from the rack 4, the four hydraulic cylinders 3 will operate.

The female and male rails 21, 11 of the inner and outer walls 2, 1 are designed to serve as support columns thereof. Please refer to FIGS. 8 and 9, the female rail 21 is formed with an opening 21a and the male rail 11 is slidably engaged in opening 21a and has a bent plate 11a which partially wraps around the female rail 21 so that the wall board of the outer wall 1 can be disposed on two sides of the male rail 11 at 90° or 180° angle. Also, the wall board of the inner wall 2 can be disposed on two sides of the female rail 21 at 90° or 180° angle. Such arrangement can enhance the guiding effect.

I claim:

1. A volume-changeable van compartment comprising:

an outer wall and an inner wall wherein four hydraulic cylinders are disposed on said inner wall to life/lower said outer wall;

an equilibration mechanism for keeping said hydraulic cylinders performing extending/retracting function at the same speed; and a locking mechanism for locking up said outer wall at a certain height;

said equilibration mechanism including four vertical racks and three horizontal gear rods, upper ends of said four racks being pivotably connected with said outer wall, and three gear rods being disposed on two lateral surfaces and front surface of said inner wall, respectively; said front surface gear rod being disposed with a bevel gear at each of two ends of said front surface gear rod, one end of each lateral surface gear rod being disposed with a bevel gear which meshes respectively with each said bevel gear of said front surface gear rod, each end of each lateral surface gear rod being disposed with a gear which meshes with one of said four racks;

said locking mechanism including four locking devices corresponding to said four racks, and pneumatic cylinder being used to drive a toothed block which engages with said rack;

a plurality of vertical male rails evenly disposed on said outer wall and a plurality of corresponding female rails disposed on said inner wall;

a groove on each of two sides of each said female rail whereby a wall board can be disposed between two adjacent female rails to form a portion of said inner wall;

a beam member connected to an upper edge of each said wall board of said inner wall; and, two hydraulic cylinders connected to two ends of said beam member to lift/lower said beam member and said wall board.

2. A volume-changeable van compartment as claimed in claim 1 wherein, said female rails of said inner wall are formed with an opening, said male rails slidably engaged in said opening and having a bent plate which partially wraps around said female rails, wherein a groove is formed on each of two sides at each said male rail whereby a wall board can be disposed between two adjacent male rails to form a portion of said outer wall.

* * * * *